United States Patent

[11] 3,543,817

[72] Inventor Roy H. Anderson
P.O. Box 1445, Victoria, British Columbia, Canada
[21] Appl. No. 698,055
[22] Filed Jan. 15, 1968
[45] Patented Dec. 1, 1970

[54] SAW CHAIN
5 Claims, 6 Drawing Figs.
[52] U.S. Cl....................................................... 143/135
[51] Int. Cl...................................................... B27b 33/14
[50] Field of Search........................................... 143/135, 133

[56] References Cited
UNITED STATES PATENTS
2,351,112  6/1944  Day............................. 143/135
3,340,911  9/1967  Wolf............................ 143/135
3,346,025  10/1967  Anderson et al............. 143/135

Primary Examiner—Donald R. Schran
Attorney—Seed, Berry & Dowrey

ABSTRACT: A saw chain made up entirely of cutter tooth links, raker tooth links, twin safety guards or lateral guide links, spacer links and side connector links. A complete sequence normally includes a pair of side link mounted safety guards, a link carrying only a bifurcated cutter tooth followed immediately by a separate link carrying only a raker tooth and at least one spacer link immediately following the raker tooth. Both the cutter tooth link and the raker tooth link are center links, i.e. located on the longitudinal center line of the chain. Each sequence may include one or more spacer links following the raker tooth, depending upon the amount of chip flow capacity desired. It has been discovered that the cutter tooth link may be so related to the raker tooth link as to itself perform the function of conventional depth gauges used in the prior art, therefore eliminating the need for such depth gauges.

Patented Dec. 1, 1970
3,543,817
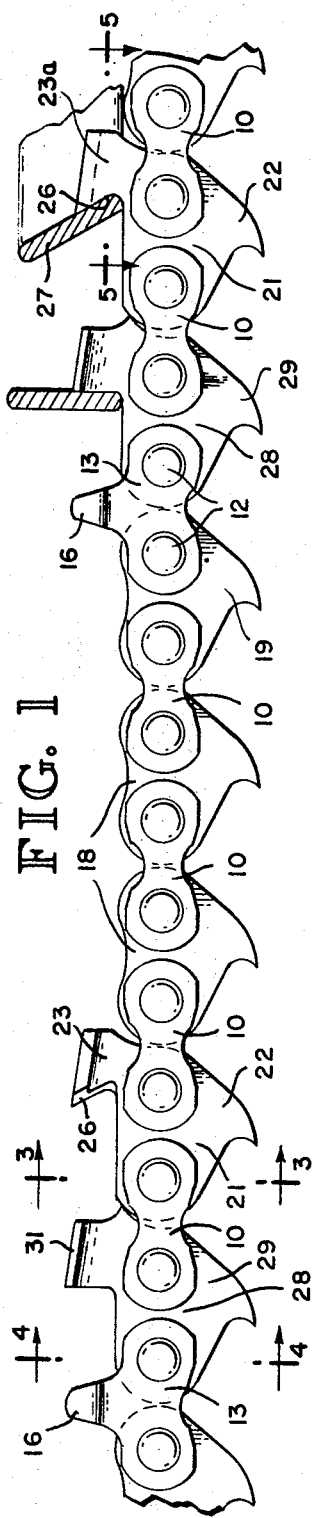
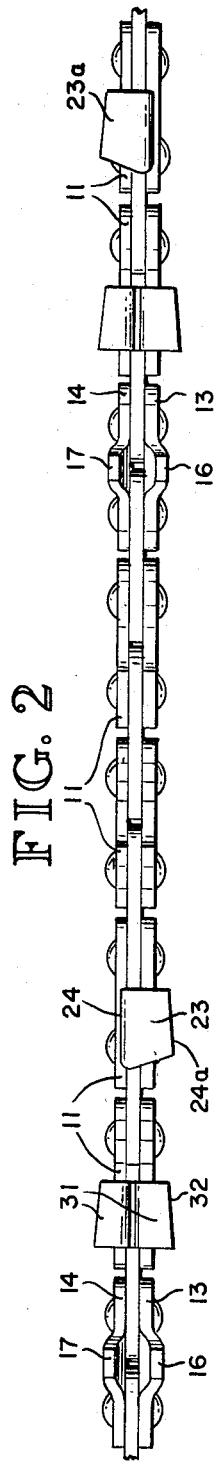
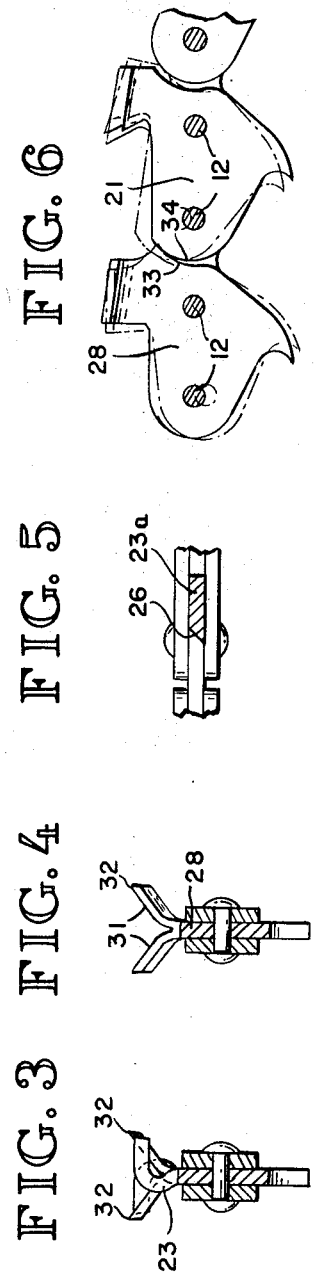
INVENTOR.
ROY H. ANDERSON
BY
ATTORNEYS 3,543,817

SAW CHAIN

BACKGROUND OF THE INVENTION

The present invention relates to saw chains in general and in particular to a saw chain wherein the sequence of links is comprised of cutter tooth links, raker tooth links and spacer links. In addition, a pair of side link mounted safety guards may be included in the sequence ahead of the cutter links and act primarily as deflectors to protect the cutter link and to relieve the load on the cutter tooth during side cutting. The cutter tooth links and the raker tooth links are center-mounted links located on the longitudinal center line of the chain with the raker tooth link following immediately behind the cutter tooth with one or more spacer links following the raker tooth.

The intended purpose of the raker tooth when used in combination with a bifurcated cutter link is to remove the material remaining between the laterally spaced slits or cuts made by the side elements of the cutter tooth. In addition to cutters and rakers, it has been the practice to utilize depth gauges immediately preceding the cutter teeth or the raker teeth or both. These depth gauges are carried either on independent links or on the same link as the associated cutter or raker tooth. It has been discovered that the depth gauges may be eliminated entirely from the particular sequence since, in most instances, a depth gauge immediately preceding a raker tooth and following a bifurcated cutter tooth acts as a raker in its own right, and, since it is improperly shaped for a raker, the wood fibres loosened by the depth gauge tend to pile up or wad up in front of the depth gauge causing the following raker tooth to become irradic in relation to its depth of cut, causing a tearing action and a resultant fuzzy cut. By placing the cutter tooth and the raker tooth on independent pivotally connected links immediately adjacent one another and by properly shaping the links, the cutter link becomes an effective depth gauge for the raker tooth, and conversely the raker tooth link becomes an effective means for balancing the overturning torque induced by the cutting forces on the cutter tooth link.

The saw chain construction provided by the present invention not only functions more efficiently and economically than prior art saw chains of the general type involved but, by the elimination of depth gauges, provides increased volume for chip flow within the kerf and eliminates the need for maintenance of depth gauges. The construction is further improved by the use of twin safety guards for protecting the cutter tooth and preventing unbalanced loads thereon, as will be more fully explained in the detailed description which follows.

Accordingly, the primary object of the present invention is to provide a saw chain construction which eliminates the need for depth gauges and which provides an improved smoothness of cut edges, ability to feed, and more freely running chain for a long bar.

Another object of the invention is to provide a chain saw construction wherein the cutter tooth links and the raker tooth links are center-links so as to eliminate all lateral torque. By virtue of the fact that the load-bearing links, i.e. cutters and rakers, are center-mounted, the rivets are in double shear and hence the chain is stronger and may be made in smaller pitch.

Another object of the present invention is to provide a saw chain construction of the character described wherein the raker tooth links and the cutter tooth links are embodied on separate pivotally connected links with the cutter tooth link immediately preceding the raker tooth link and acting as a depth gauge therefor and with the raker tooth acting as a means for balancing the overturning torque induced by the cutting forces on the cutter link.

Another object of the present invention is to provide a saw chain construction of the character described wherein each cutter and raker tooth link combination is separated by one or more spacer links providing an increased volume for chip flow.

Another object of the present invention is to provide a saw chain of the character described wherein the cutter tooth link is a bifurcated V-tooth or U-tooth construction with laterally spaced cutting elements which sever the wood fibres and form two small parallel kerfs with the material therebetween being removed by the raker tooth which follows immediately in sequence behind the cutter tooth.

Yet another object of the present invention is to provide a saw chain construction of the character described which includes a pair of side link-mounted safety guards or guide links immediately ahead of the cutter tooth for deflecting foreign materials so as to prevent undue exposure of the V-tooth cutting edges and to prevent an unbalanced load on the cutters when side cutting, cutting diagonally across wood grain and boring.

These and other objects and advantages of the invention will be apparent from the following specification and claims and from the accompanying drawings wherein:

DESCRIPTION OF THE DRAWINGS

FIG. 1 is an elevational view of a section of saw chain embodying the present invention;

FIG. 2 is a top plan view thereof;

FIG. 3 is a cross-sectional view taken along line 3–3 of FIG. 1 with the safety guards removed so as to illustrate the relationship between the raker teeth and the cutting elements of the cutter tooth;

FIG. 4 is a cross-sectional view taken along lines 4–4 of FIG. 1 and illustrating a front elevation of the preferred form of cutter tooth;

FIG. 5 is a cross-sectional view taken along lines 5–5 of FIG. 1; and

FIG 6 is an elevational detail showing the relationship between the cutter and raker teeth links.

DESCRIPTION OF THE PREFERRED EMBODIMENT

Referring now in detail to the drawings, FIGs. 1 and 2 illustrate the sequence of links and it will be understood that such sequence is repeated in the same order and arrangement throughout the length of the chain. The chain includes spacer drive links, drive links which mount the cutter teeth and the router or raker elements, and side links, some of which mount safety guards. The side links indicated at 10 and 11 along with the other side links and together with the rivets 12 serve to join the center links in end to end pivotal relationship. The bottom surfaces of the side links provide the surface for supporting the chain on the rails of the saw bar, not shown. The side links 10 and 11 are merely positioned on opposite sides of the chain and are identical and interchangeable. The side links 13 and 14, in addition to the functions described, serve to mount the twin lateral safety guards 16 and 17 respectively immediately ahead of each cutter tooth as will presently be described in greater detail.

The center links of the chain are of three different forms, spacer links, raker tooth links and cutter tooth links. The links 18 are identical and constitute the spacer links and also include sprocket-engaging portions 19 which engage and are trained about the drive sprocket of the engine or power unit (not shown) for driving the chain.

The center links 21 have link body means which includes a sprocket-engaging portion 22 similar to the sprocket-engaging portion 19 previously described. Each of the links 21 mounts or carries an integral raker tooth which extends from the body portion of the link and which may be laterally offset from the centerline of the chain in either direction. As will be observed in FIGS. 1 and 2, the raker tooth 23 is offset laterally in the opposite direction from the raker tooth 23a. Referring to the raker tooth 23 as shown in plan view in FIG. 2, the tooth may have a straight inboard edge 24 and a slight rake angle or taper along the outside edge 24a. As indicated in FIG. 1, the top surface of each raker tooth is downwardly inclined toward the top trailing end of the link to form a rake angle. It will be appreciated that the rake angle of both the top surface and the outside edge of the raker tooth may be varied depending upon the type of wood, the speed of the chain and other variable factors. Referring to the raker tooth 23a as shown in FIGS. 1 and 5, the forward cutting face 26 of the raker is inclined rearwardly from the top edge at an acute angle which may be varied as circumstances dictate. The face 26 is preferably a planar face which may be sharpened as a chisel-bit tooth by a conventional flat, rounded edge, chain saw file 27 so as to form the face with a side angle as shown in FIG. 5. The planar, rearwardly inclined cutting face permits a free unobstructed linear flow of chips from the raker tooth. The angles of the face of the teeth 23 will, of course, be oppositely directed.

The center links 28 have link body means which is provided with a bifurcated cutter tooth with a V-shaped cross section and which also includes the sprocket-engaging portion 29. The V-shaped cutter portion has the cutting elements 31 which form the legs of the V configuration. As illustrated in FIGS. 2 and 4, the wings or legs of the V-shaped cutter tooth are identical and in this case extend at an obtuse angle laterally from the central body portion of the link 28. The angle of spread between the legs may be varied. As seen in FIG. 1, the cutter elements 31 may be formed with a top rake or taper and, as seen in FIG. 2, a side rake or taper is also formed on the cutter elements. These rake angles are both variable as has been previously explained with reference to the raker tooth angles. Each of the legs 31 of the cutter tooth is provided with a cutting edge 32 which extends the full length of the tooth. With this configuration, it will be seen that the cutter elements 31 each sever and remove a narrow chip of wood below the depth of the kerf which is then removed with a chisel action by the rakers 23 and 23a. It will also be noted that the forward face of the cutter tooth may be formed substantially vertical and planar. FIG. 1 illustrates the method of sharpening the cutter tooth wherein a conventional flat, rounded edge, chain saw file is drawn vertically across the face of the tooth at right angles to the chain.

FIG. 3 illustrates the relationship between the raker and cutter teeth wherein the total lateral reach of the successive raker teeth is less than the lateral distance between the forward points of cutting edges 32 of the cutter elements 31. With this arrangement the action of the raker tooth is limited to that of raking or chiseling out the area between the cuts made by the cutter elements 31 and no side cutting is done by the raker teeth.

Referring to FIG 6, the raker tooth link 21 and the cutter tooth link 28 are shown with the side links removed so as to more clearly illustrate the relationship between the cutter links and raker links whereby the cutter tooth link is caused to function as a depth gauge for the raker tooth when the cutter tooth is under cutting load with a force acting thereagainst in the longitudinal direction and with the raker tooth acting to balance the overturning torque induced by the cutting force. As illustrated by the dotted line provision, the raker tooth 21 is caused to pivot or rotate slightly in a clockwise direction under a cutting load. The body of the link 28 includes a heel portion with a curved contact surface 33 and the front or toe portion of the raker tooth link 21 has a cooperating contact surface 34. The curved contact surface 33 is so formed as to engage the curved contact surface 34 of the link 21 when the cutter link is under load so as to be in the slightly raised position shown in full lines. It will be noted that, in the present embodiment, the curved surfaces 33 and 34 have different centers of curvature so as to enhance the engagement when the cutter tooth is under load. With this engagement, the pivoting of the raker tooth link 21 about its rear rivet 12 and lifting of the link from the chain bar is limited and hence the depth to which the raker tooth may cut is determined by the action of the cutter tooth link. The depth of cut allowed the raker tooth may be varied, of course, by varying the shape or curvature of the surfaces 33 and 34 and the clearance between these surfaces. Thus, with the cutter tooth link 28 acting as a depth gauge for the raker tooth link 21, the need for independent depth gauges is entirely eliminated.

Referring now to the safety guards 16 and 17, these elements may be formed on conventional side links and protrude upwardly with a generally rounded top surface. The guards are used in pairs immediately ahead of the cutter link 28 and have the primary function of protecting the V-tooth cutting edges from undue exposure particularly when limbing or brush cutting and, of course, in the event of striking rocks etc. when cutting dirty wood. The guard or guide links 16 and 17 also serve to relieve the unbalanced load on the cutter teeth when side cutting, diagonal cutting and boring. Although the safety guards will act as an additional overturning, balancing element in the case of poor or sloppy filing, when the chain is carefully filed the safety guards can be completely removed and still have a smooth cutting chain.

From the foregoing, it will be apparent to those skilled in the art that the present invention provides new and useful improvements in saw chains of the character described. The arrangement and types of structural details utilized within this invention may be subjected to numerous modifications well within the purview of this invention and applicant intends only to be limited to a liberal interpretation of the specification and appended claims.

I claim:

1. In a and following chain composed of a plurality of independent links including cutter tooth links, raker tooth links and spacer links with means to pivotally join said links, said links being assembled in link sequences, each sequence comprising; a cutter tooth link, a raker tooth link immediately adjacent and following said cutter tooth link with respect to the direction of travel of the chain, and at least one spacer drive link immediately adjacent and following said raker tooth link, said cutter tooth links and raker tooth links being so formed that the cutter tooth link, under cutting load, acts as a depth gauge for the raker tooth and the raker tooth link, under cutting load, acts to counterbalance the overturning torque within the cutter tooth link said cutter tooth links raker tooth links and spacer links are center links, the cutter tooth of the cutter links being bifurcated and extending laterally from the link body presenting spaced sidecutter elements, and said means to pivotally join said links comprising side links pivotally interconnecting said center links, the pivotally connected side links preceding at least some of said cutter links being provided with identical upwardly extending guard elements adapted to protect the cutter elements.

2. The saw chain according to claim 1 wherein; the two side links immediately preceding and pivotably connected to at least some of said cutter links are provided with identical upwardly extending guard elements adapted to protect the cutter elements.

3. The saw chain according to claim 2 wherein; the front faces of said cutter elements are substantially vertical and the front faces of the raker teeth are planar and inclined rearwardly from the top edges thereof.

4. In a saw chain composed of a plurality of independent links including cutter tooth links, raker tooth links and spacer links with means to pivotally join said links, said links being assembled in link sequences, each sequence comprising; a cutter tooth link, a raker tooth cutter with respect to the direction of travel of the chain, and at least one spacer drive link immediately adjacent and following said raker tooth link, said raker tooth and said cutter tooth links including link body means adapted to cooperate to limit the pivotal movement of the raker tooth to the cutter tooth under leaded conditions, whereby the cutter tooth acts as a depth gauge for the raker tooth and the raker tooth link, under cutting load, acts to counterbalance the overturning torque within the cutter tooth links, said cutter tooth links, raker tooth links and spacer links are center links and said means to pivotally interconnect in said center links, the link body means of each center link includes a sprocket-engaging engaging root portion extending therefrom, said cutter teeth being bifurcated and extending from the associated link body means in a direction opposite said root portion presenting spaced side cutter elements, and said raker teeth extending from the associated link body means in a direction opposite the root portion, each raker tooth is offset laterally from the center line of the associated link body with the raker teeth of each successive sequence in the chain being offset in opposite directions, and the total lateral reach of the successive raker teeth is less than the lateral distance between the forward points of the cutter elements, the body means of said raker tooth link has an extended toe portion with a first contact surface thereon, the body means of said cutter tooth link being provided with a heel portion having a second contact surface adapted to engage said first contact surface to limit the movement of the raker tooth relative to the cutter tooth when the cutter tooth is under a cutting load, said first contact surface is convexly curved and said second contact surface is concavely curved, said second contact surface overlying the first contact surface in close proximity with the curved surfaces having different centers of curvature, the two side links immediately preceding and pivotably connected to at least some of said cutter links are provided with identical upwardly extending guard elements adapted to protect the cutter elements.

5. The saw chain according to claim 4 wherein; the front faces of said cutter elements are substantially vertical and the front faces of the raker teeth are planar and inclined rearwardly from the top edges thereof.